US006266224B1

(12) United States Patent
Lang

(10) Patent No.: US 6,266,224 B1
(45) Date of Patent: Jul. 24, 2001

(54) BROADBAND COAXIAL OVERVOLTAGE PROTECTOR

(75) Inventor: Manfred Lang, Taufkirchen (DE)

(73) Assignee: Spinner GmbH Elektrotechnische Fabrik, München (DE)

( * ) Notice: Subject to any disclaimer, the term of this patent is extended or adjusted under 35 U.S.C. 154(b) by 0 days.

(21) Appl. No.: 09/368,876

(22) Filed: Aug. 5, 1999

(30) Foreign Application Priority Data

Aug. 6, 1998 (DE) .......................................... 198 35 531

(51) Int. Cl.[7] .................................................. H02H 3/20

(52) U.S. Cl. ......................... 361/119; 361/91.1; 361/107

(58) Field of Search .................................. 361/119, 91.1, 361/111, 107, 117–118

(56) References Cited

U.S. PATENT DOCUMENTS 4,509,090 * 4/1985 Kawanami et al. ................ 361/119
4,544,984 * 10/1985 Kawanami et al. ................ 361/119
5,844,766 * 12/1998 Miglioli .............................. 361/119
5,953,195 * 9/1999 Pagliuca .............................. 361/120
5,978,199 * 11/1999 Germann et al. .................... 361/119

* cited by examiner

*Primary Examiner*—Michael J. Sherry
(74) *Attorney, Agent, or Firm*—Henry M. Feiereisen

(57) ABSTRACT

A broadband coaxial overvoltage protector includes a short-circuit line segment connected in parallel with a coaxial line section, a transforming coaxial line section with a length <λ/4, with one end of the transforming coaxial line section connected in series to the coaxial line section, and an open-circuit line segment connected in series to the other end of the transforming line section. The length of the transforming line section is selected in such a way that the curve representing the frequency dependence of the reflection coefficient for two different operating frequencies, which may be widely spaced, has a respective minimum at each of the two frequencies.

9 Claims, 3 Drawing Sheets

BROADBAND COAXIAL OVERVOLTAGE PROTECTOR

The invention relates to a broadband coaxial overvoltage protector with an open-circuit line segment connected in series with a parallel circuit formed of a coaxial line section connected in parallel with a short-circuit line.

BACKGROUND OF THE INVENTION

Coaxial overvoltage protectors consisting of a coaxial line section connected in parallel with a short-circuit line, typically a λ/4 short-circuit line, are known in the art. Such conventional overvoltage protectors have a very small bandwidth. Even with a VSWR of 1.1, only a relatively small bandwidth of 20% can be realized. A greater bandwidth can only be attained if the characteristic impedance $Z_k$ of the short-circuit line segment is made larger than the characteristic impedance $Z_o$ of the coaxial line section. However, $Z_k$ cannot be made arbitrarily large, because the remaining received residual spurious voltage is proportional to $Z_k$. However, if an open-circuit line segment is connected in series with a parallel circuit consisting of the coaxial line section and the short-circuit line, then a bandwidth of about one octave can be achieved with a VSWR of 1.1 (corresponding to a reflection coefficient of approximately 0.05) near the edges of the transmission region.

An overvoltage protector of this type, however, has limited use if two narrow frequency bands are to be transmitted over the line and the center frequencies of the two frequency bands are spaced far apart, for example by one octave. This applies in particular to mobile communication applications where the signals of, for example, the D-network (890 to 960 MHz) and of the E-network (1710 to 1880 MHz) are transmitted to the antenna of the base station over a common antenna cable.

SUMMARY OF THE INVENTION

It is therefore an object of the invention to provide a broadband coaxial overvoltage protector with a particularly small reflection coefficient near the edges of a predetermined frequency range.

According to one aspect of the invention, a transforming coaxial line section having a length of <λ/4 is provided between the connection point of the short-circuit line segment and the connection point of the open-circuit line.

λ is equal to the wavelength corresponding to the center frequency of the predetermined frequency range. It has been observed and can also be shown by computation that the reflection coefficient of the overvoltage protector according to the invention has a frequency dependence with two small minima. The minima are located on either side of a maximum which is located approximately in the center of the band. The center portion of the band is not used. The minima can be spaced apart by more than one octave and have adequate bandwidth. The position and magnitude of the minima depends on the dimensions of the respective line elements, which include the short-circuit line, the transforming line section and the open-circuit line.

According to one aspect of the invention, the length of the transforming line section which is connected in series between the open-circuit line segment and the short-circuit line, can be selected in such a way that the curve representing the frequency dependence of the reflection coefficient for two different operating frequencies of the overvoltage protector has a respective minimum at the two frequencies.

Advantageously, the characteristic impedance of the short-circuit line segment can have a higher resistance and the characteristic impedance of the open-circuit line segment can have a lower resistance than the characteristic impedance of the coaxial line section.

According to yet another aspect of the invention, the impedance of the short-circuit line segment may be between twice and three times as large as the characteristic impedance of the coaxial line section and the characteristic impedance of the open-circuit line segment may be approximately between one half and one quarter of the characteristic impedance of the coaxial line section.

The overvoltage protector according to the invention may advantageously be built of smaller size than a conventional overvoltage protector, since both the length of the short-circuit line segment and the length of the open-circuit line segment may be approximately 20 to 30% smaller than λ/4.

In most applications, the length of the transforming coaxial line section may be approximately 20 to 50% of λ/4.

According to still another aspect of the invention, the open-circuit line segment may have a section with a diameter which is smaller than the diameter of the inner conductor of the transforming coaxial line section, a sleeve surrounding this section and made of a dielectric material, wherein the length of the sleeve corresponds to the length of the open-circuit line, and a tubular section, which coaxially surrounds the sleeve, of the subsequent inner conductor which cooperates with the continuous outer conductor of the overvoltage protector.

BRIEF DESCRIPTION OF THE DRAWINGS

A schematic, simplified example of an overvoltage protector according to the invention is shown in the drawing, and its reflection behavior is explained by way of a diagram. It is shown in.

DETAILED DESCRIPTION OF PREFERRED EMBODIMENTS

Figure 1:
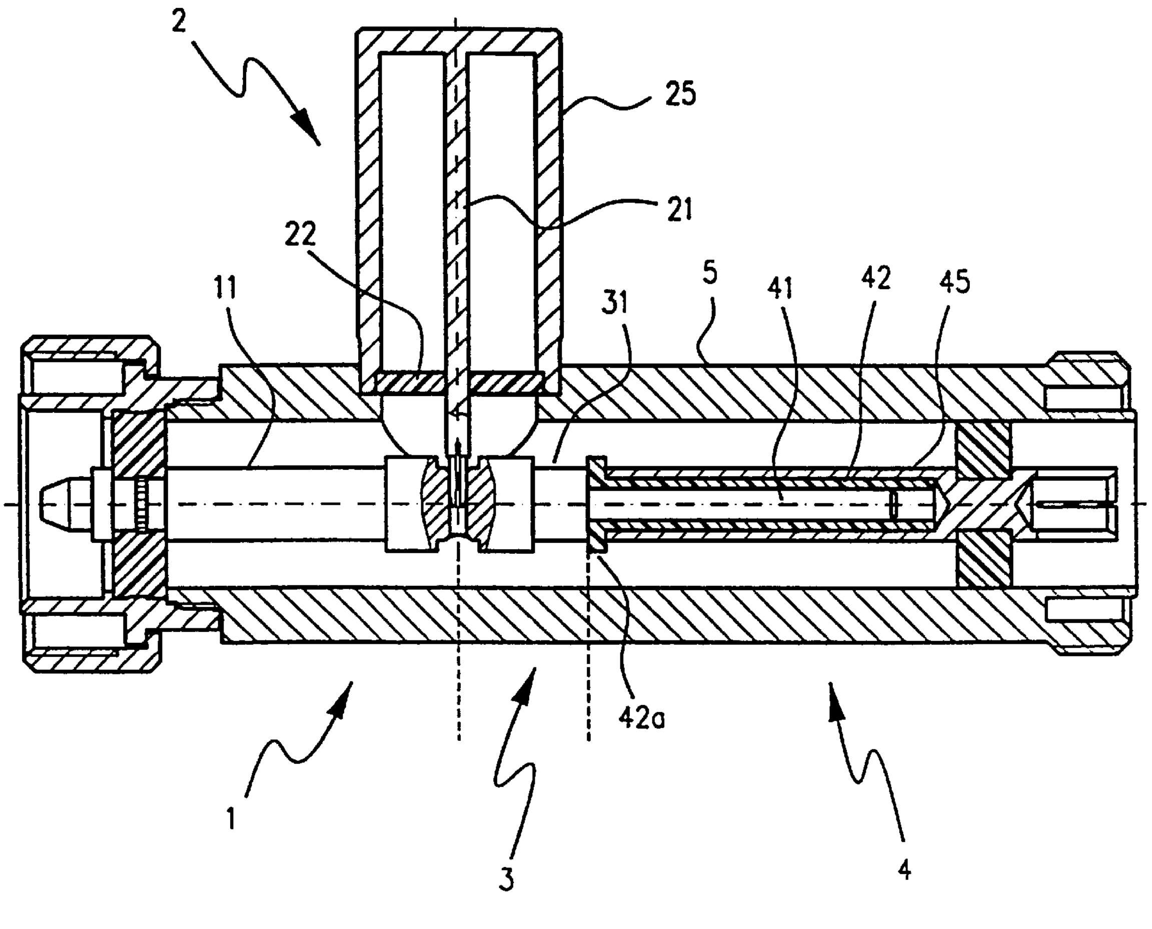
FIG. 1 a longitudinal cross-section of an overvoltage protector.

Referring now to FIG. 1, the overvoltage protector is constructed as a coaxial assembly, wherein both ends of the assembly are provided with plug connections which can be of any type and will not be described in detail. The overvoltage protector is reciprocal and includes a coaxial line section 1, a short-circuit line segment 2 connected in parallel with the coaxial line section 1, a short transforming coaxial line section 3, and an open-circuit line segment 4 connected in series therewith. The outer conductor 25 of the short-circuit line segment 2 can be regarded as a section of the outer conductor 5 which is common to the other line sections. The inner conductor 21 of the short-circuit line segment 2 is connected in a conventional manner with the inner conductor 11 of the coaxial line section 1, in the present example as a plug/jack. The other end of the inner conductor 21 is electrically connected to the outer conductor 25. The length of the short-circuit line segment is less than λ/4, wherein λ is the wavelength corresponding to the calculated center frequency which is not being used. The diameter of the inner conductor 21 and the inner diameter of the outer conductor 25 of the short-circuit line segment are selected so that the characteristic impedance of the short-circuit line segment is between about twice and three times as large as the characteristic impedance of the coaxial line.

The inner conductor 31 of the transforming line section 3 connects the inner conductor 11 of the coaxial line section 1 with the inner conductor 21 of the short-circuit line segment 20. The length of the transforming line section is typically less than λ/8. The illustrated step in the diameter compensates for the opening in the outer conductor 5 through which the inner conductor 21 of the short-circuit line segment 2 is connected to the outside. The inner conductor 21 is held in place by an insulating disk 22.

The open-circuit line segment 4 is connected in series with the transforming line section 3. The length of the open-circuit line segment 4 can be identical to the length of the short-circuit line segment 2. The open-circuit line segment 4 includes the inner conductor 41 which is connected directly to the inner conductor 31 and has a significantly smaller diameter than the inner conductor 31. The open-circuit line segment further includes a sleeve 42 which surrounds the inner conductor 41 and is made of a dielectric material. The sleeve 42 has an annular flange **42*a* which electrically separates the tubular section 45 surrounding the sleeve of the inner conductor 41 subsequent to the coaxial line, from the inner conductor 41 of the transforming line section 3. The tubular section 45 thus forms the outer conductor of the open-circuit line segment 4. With this particular choice of the diameter and dielectric constant of the sleeve 42, the characteristic impedance of the open-circuit line segment is about one half to one quarter of the characteristic impedance of the coaxial line section 1**.

Using the following parameters:

$Z_o$=impedance of the over voltage protector, $Z_k$=input impedance (reactance) of the short-circuit line, $Z_3$=characteristic impedance of the transforming line with a length I3, $Z_L$=input impedance (reactance) of the open-circuit line, $I_k$=length of the short-circuit line, $I_3$=length of the transforming line, $I_L$=length of the open-circuit line segment, f=frequency, the frequency dependence of the reflection coefficient r(f) is obtained from conventional impedance line transformation equations:

$$Z_k(f) = j * Z_K * \tan\left(2\pi * l_K * \frac{f * \sqrt{\varepsilon_r}}{c} * 10^3\right)$$

$$Z_l(f) = \frac{Z_o * Z_K(f)}{Z_o + Z_K(f)}$$

$$Z_2(f) = Z_l(f) * \frac{1 + \frac{Z_3}{Z_l(f)} * i * \tan\left(2\pi l_3 * f * \sqrt{\varepsilon_r} * \frac{10^3}{c}\right)}{1 + \frac{Z_l(f)}{Z_3} * i * \tan\left(2\pi l_3 * f * \sqrt{\varepsilon_r} * \frac{10^3}{c}\right)}$$

-continued $$Z_L(f) = -i * Z_L * \frac{1}{\tan\left(2\pi * l_L f * \frac{\sqrt{\varepsilon_r}}{c} * 10^3\right)}$$

$$Z_3(f) = Z_2(f) + Z_L(f)$$

$$r(f) = \frac{Z_3(f) - Z_0}{Z_3(f) + Z_0}$$

$$r_{abs} = \sqrt{((\mathrm{Re}(r(f)))^2 + (\mathrm{Im}\,r(f))))^2}$$

Figure 2:
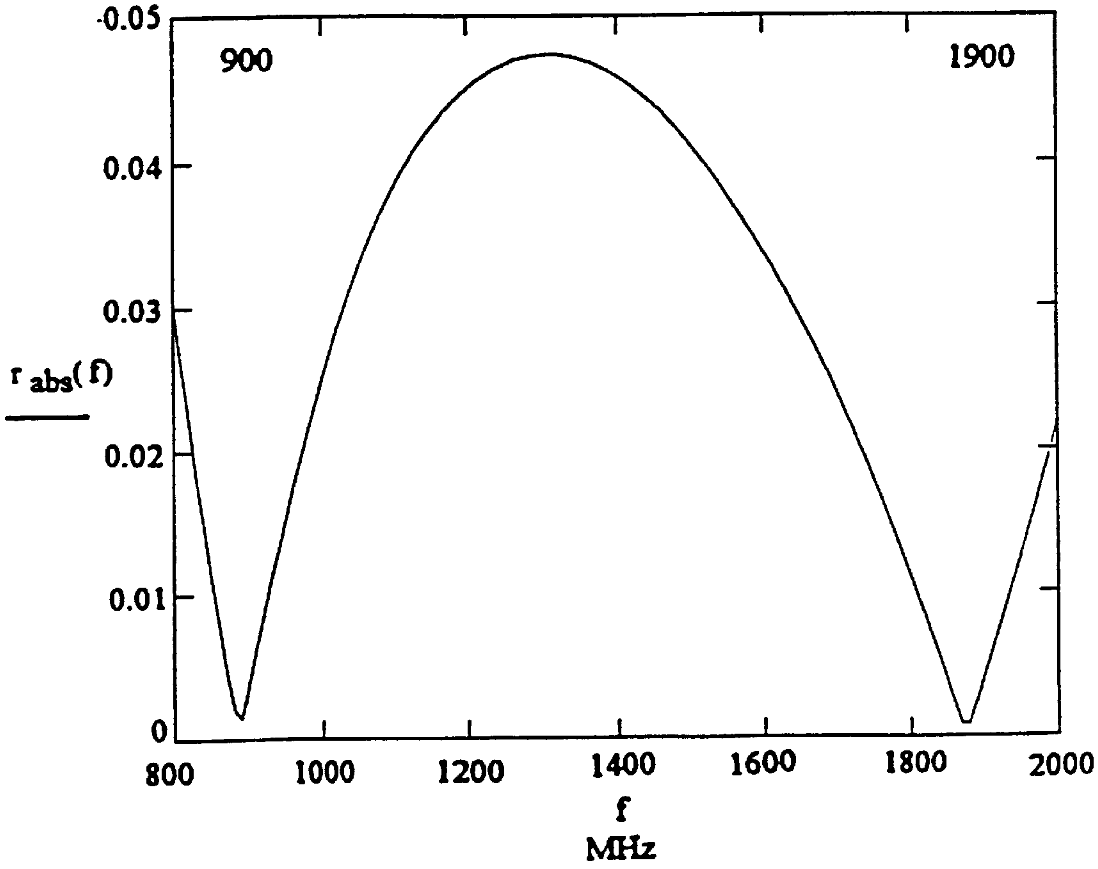
FIG. 2 the frequency dependence of the reflection coefficient for a practical embodiment of the overvoltage protector.

Referring now to FIG. 2, the curve for the reflection coefficient r of an exemplary embodiment of an overvoltage protector designed for a common antenna cable of a D-network and an E-network base station is obtained using the following parameters:

f=800 . . . 2000 MHz $Z_o$=50 Ohm c=3*$10^8$ m/s $\epsilon_r$=1

$Z_K$=120 Ohm; $I_K$=40 mm $Z_L$=20.743 Ohm; $I_L$=40 mm $Z_3$=50 Ohm; $I_3$=12 mm

Figure 3:
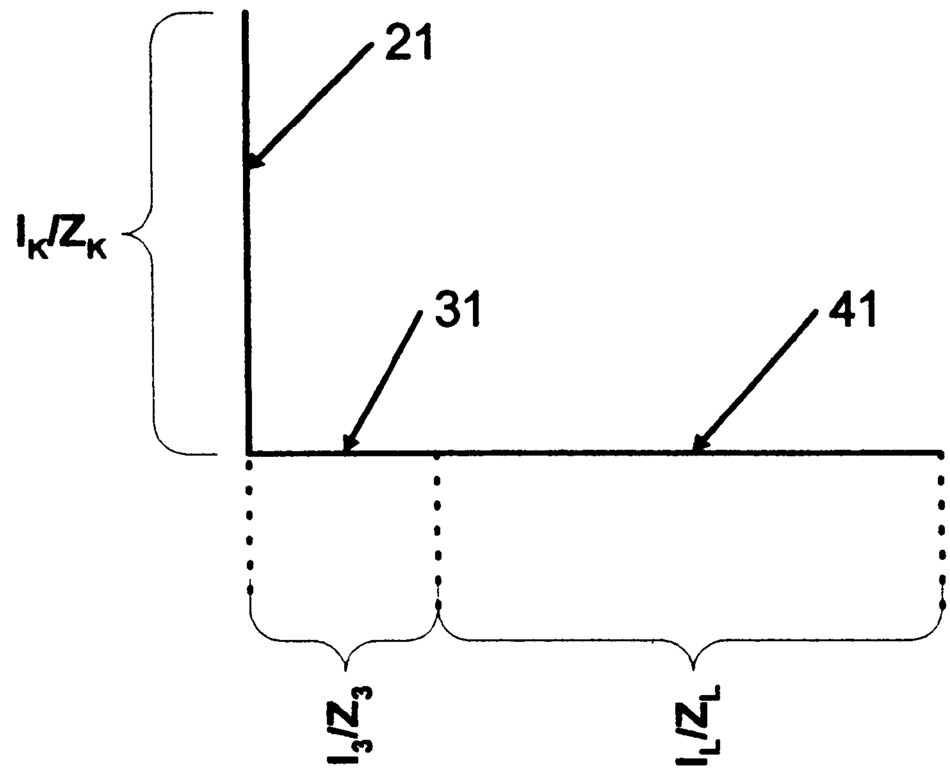
FIG. 3 a greatly simplified diagram of the overvoltage protector for the purpose of illustrating the variables used in the diagram of the reflection coefficient of FIG. 2.

The definition of these quantities for an overvoltage protector is indicated schematically in FIG. 3.

What is claimed is:

1. A broadband coaxial overvoltage protector, comprising:

a coaxial line section;

a short-circuit line segment connected in parallel with the coaxial line section;

an open-circuit line segment connected in series with the coaxial line section; and a transforming coaxial line section having a length of <λ/4 connected in series between the coaxial line section and the open-circuit line segment.

2. The overvoltage protector of claim 1 wherein the length of the transforming coaxial line section is so selected that the curve representing the frequency dependence of the reflection coefficient for two different operating frequencies of the overvoltage protector has a respective minimum at each of the two frequencies.

3. The overvoltage protector of claim 1 wherein a characteristic impedance of the short-circuit line segment has a higher impedance value than a characteristic impedance of the coaxial line section, and a characteristic impedance of the open-circuit line segment has a lower impedance value than a characteristic impedance of the coaxial line section.

4. The overvoltage protector of claim 3 wherein the impedance of the short-circuit line segment is between twice and three times as large as the characteristic impedance of the coaxial line section and the characteristic impedance of the open-circuit line segment is approximately between one half and one quarter of the characteristic impedance of the coaxial line section.

5. The overvoltage protector of claim 1 wherein a length of the short-circuit line segment is approximately 20 to 30% smaller than λ/4.

6. The overvoltage protector of claim 1 wherein a length of the open-circuit line segment is approximately 20 to 30% smaller than λ/4.

7. The overvoltage protector of claim 1 wherein a length of the transforming coaxial line section is approximately 20 to 50% of λ/4.

8. The overvoltage protector of claim 1 wherein the transforming coaxial line section has a first inner conductor and the open-circuit line segment further includes a first section having a diameter which is smaller than a diameter of the first inner conductor of the transforming coaxial line section, a sleeve surrounding the first section and made of a dielectric material, wherein a length of the sleeve corresponds to a length of the open-circuit line segment, and a second inner conductor coaxially surrounding the sleeve and having a tubular section which cooperates with the continuous outer conductor of the overvoltage protector.

9. The overvoltage protector of claim 8 wherein the sleeve includes an annular flange which electrically separates the first inner conductor from the second inner conductor.

* * * * *